US010033793B2

(12) United States Patent
Lindberg et al.

(10) Patent No.: US 10,033,793 B2
(45) Date of Patent: *Jul. 24, 2018

(54) METHODS AND APPARATUS FOR MONITORING A PORTABLE DEVICE

(71) Applicant: The Nielsen Company (US), LLC, New York, NY (US)

(72) Inventors: Tero Lindberg, Espoo (FI); Jason Browne, Columbia, MD (US); John Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,623

(22) Filed: Sep. 30, 2016

(65) Prior Publication Data
US 2017/0026454 A1 Jan. 26, 2017

Related U.S. Application Data

(63) Continuation of application No. 13/731,607, filed on Dec. 31, 2012, now Pat. No. 9,473,555.

(51) Int. Cl.
G06F 15/173 (2006.01)
H04L 29/08 (2006.01)
(Continued)

(52) U.S. Cl.
CPC .............. H04L 67/025 (2013.01); G06F 8/65 (2013.01); G06F 9/3009 (2013.01);
(Continued)

(58) Field of Classification Search
CPC ... H04L 29/08; H04L 29/08099; H04L 67/02; H04L 67/22; H04L 67/26; H04L 67/34;
(Continued)

(56) References Cited

U.S. PATENT DOCUMENTS 8,442,960 B1 5/2013 Meyer et al.
2004/0083299 A1 4/2004 Dietz et al.
(Continued)

FOREIGN PATENT DOCUMENTS

WO 2011042260 4/2011

OTHER PUBLICATIONS

Diaz, Mobile Application Profiling for Connected Mobile Application, 2010.*
(Continued)

Primary Examiner — Chris Parry
Assistant Examiner — WeiWei Stilner
(74) Attorney, Agent, or Firm — Hanley, Flight & Zimmerman, LLC

(57) ABSTRACT

Methods and apparatus for monitoring a portable device are disclosed herein. An example method includes connecting to a portable device using a shell. Whether the shell has an elevated privilege on the portable device is verified. In response to detecting that the shell does not have the elevated privilege, the elevated privilege is gained. A packet capturer is installed on the portable device using the elevated privilege, the packet capturer to capture packets to produce media exposure data, the elevated privileges to enable the packet capturer to capture packets after disconnection of the shell from the portable device.

20 Claims, 5 Drawing Sheets

(51) Int. Cl.
*G06F 9/30* (2018.01)
*G06F 9/50* (2006.01)
*G06F 9/48* (2006.01)
*G06F 9/455* (2018.01)
*G06F 9/46* (2006.01)
*G06F 9/54* (2006.01)
*G06F 21/51* (2013.01)
*H04L 12/26* (2006.01)
*G06F 21/50* (2013.01)
*G06F 21/52* (2013.01)
*G06F 8/65* (2018.01)
*G06F 21/62* (2013.01)

(52) U.S. Cl.
CPC ...... *G06F 9/30043* (2013.01); *G06F 9/45512* (2013.01); *G06F 9/468* (2013.01); *G06F 9/4812* (2013.01); *G06F 9/4881* (2013.01); *G06F 9/5011* (2013.01); *G06F 9/5027* (2013.01); *G06F 9/5033* (2013.01); *G06F 9/5038* (2013.01); *G06F 9/5061* (2013.01); *G06F 9/545* (2013.01); *G06F 21/50* (2013.01); *G06F 21/51* (2013.01); *G06F 21/52* (2013.01); *G06F 21/6218* (2013.01); *H04L 29/08072* (2013.01); *H04L 29/08099* (2013.01); *H04L 43/08* (2013.01); *H04L 43/0876* (2013.01); *H04L 43/18* (2013.01); *H04L 67/02* (2013.01); *H04L 67/22* (2013.01); *H04L 67/26* (2013.01); *H04L 67/34* (2013.01)

(58) Field of Classification Search
CPC ..... H04L 43/08; H04L 43/0876; G06F 9/468; G06F 9/5027; G06F 9/45512; G06F 9/545; G06F 9/30043; G06F 9/4812; G06F 9/5033; G06F 9/5038; G06F 9/3009; G06F 9/4881; G06F 9/5011; G06F 9/5061; G06F 21/50; G06F 21/51; G06F 21/52
USPC .................................................. 709/224–226
See application file for complete search history.

(56) References Cited

U.S. PATENT DOCUMENTS

| | | |
|---|---|---|
| 2008/0183716 A1 | 7/2008 | Hayek et al. |
| 2009/0300532 A1 | 12/2009 | Cowan |
| 2010/0011446 A1* | 1/2010 | Klucher .............. G06F 21/10 726/27 |
| 2010/0325299 A1 | 12/2010 | Rao et al. |
| 2011/0134758 A1 | 6/2011 | Fujisawa |
| 2011/0314542 A1 | 12/2011 | Viswanathan et al. |
| 2012/0203363 A1 | 8/2012 | McKenna et al. |
| 2012/0278878 A1 | 11/2012 | Barkie et al. |
| 2012/0331480 A1 | 12/2012 | Ertugay et al. |
| 2013/0254159 A1 | 9/2013 | Thramann et al. |
| 2013/0318238 A1 | 11/2013 | Hall et al. |
| 2014/0019958 A1* | 1/2014 | Sherman .............. G06F 8/61 717/178 |

OTHER PUBLICATIONS

International Searching Authority, "International Search Report & Written Opinion", issued in connection with International Application No. PCT/US2013/077784, dated Apr. 9, 2014 (13 pages).

United States Patent and Trademark Office, "Non-Final Office Action", issued in connection with U.S. Appl. No. 13/731,607, dated Jul. 16, 2015 (14 pages).

United States Patent and Trademark Office, "Notice of Allowance", issued in connection with U.S. Appl. No. 13/731,607, dated Jun. 17, 2016 (13 pages).

* cited by examiner

METHODS AND APPARATUS FOR MONITORING A PORTABLE DEVICE

RELATED APPLICATION

This patent arises from a continuation of U.S. patent application Ser. No. 13/731,607, entitled "APPARATUS, SYSTEM AND METHODS FOR PORTABLE DEVICE TRACKING USING TEMPORARY PRIVILEGED ACCESS" which was filed on Dec. 31, 2012. U.S. patent application Ser. No. 13/731,607 is hereby incorporated herein by reference in its entirety.

FIELD OF THE DISCLOSURE

The present disclosure is directed to processor-based audience analytics. More specifically, the disclosure describes systems and methods for monitoring a portable device.

BACKGROUND

Audience measurement entities have looked for ways in which to track device usage, including software and application data, web-based data, device status, etc. Some exemplary systems and methods have been developed to this end, including U.S. patent application Ser. No. 13/001,492, titled "Mobile Terminal And Method For Providing Life Observations And A Related Server Arrangement And Method With Data Analysis, Distribution And Terminal Guiding" filed Mar. 9, 2009, U.S. patent application Ser. No. 13/002,205, titled "System And Method For Behavioral And Contextual Data Analytics," filed Mar. 8, 2009, and Int'l Pat. Pub. No. WO 20111161303 titled "Network Server Arrangement for Processing Non-Parametric, Multi-Dimensional Spatial And Temporal Human Behavior Or Technical Observations Measured Pervasively, And Related Method For The Same," filed Jun. 24, 2010. Each of these documents is assigned to the assignee of the present application and is incorporated by reference in its entirety herein.

While such methods have shown a certain level of success in tracking device usage, most conventional device usage tracking systems do not provide the level of detail needed on the device level. For devices that have utilized lower-level device tracking, the tracking software requires a portion that collects the information on the wireless device to be executed outside a context of an operating system of the wireless device. Furthermore, the software tracking portion is embedded within a firmware layer and a kernel layer of the wireless device, which may be incompatible with security protocols of certain operating systems. One example of such a system may be found in U.S. Pat. No. 8,014,726 to Petersen et al., titled "Method and System for Collecting Wireless Information Transparently and Non-Intrusively," issued Sep. 6, 2011, which is incorporated by reference in its entirety herein.

Certain operating systems, like Android OS, are developed on Linux kernel and inherit the security model of Linux. In particular, Android OS treats Android application package as non-privileged user. Each Android package has a unique Linux user ID assigned to it during installation. This has the effect of sandboxing the process and resources it creates, so that it can't affect, or be affected by, other applications. The security model creates a problem for monitoring application when the monitoring software application cannot see other applications, such as browser software URL data, directly without the other application opening up specific interfaces for monitoring. Currently, browser applications may not offer an interface for monitoring by another application. What is needed is an efficient and easy-to-implement configuration for monitoring web traffic while minimizing the impact on underlying OS security features.

SUMMARY

Accordingly, apparatuses, systems and methods are disclosed for monitoring web traffic and other packet-based data. In one exemplary embodiment, a computer-implemented method for monitoring a portable device, comprising the steps of activating an access software component, embodied in a tangible medium, configured to access at least a kernel layer in the portable device; deactivating the access software component; configuring a software component, embodied in a tangible medium, to execute packet capturing on the portable device when the access software component is deactivated; receiving and identifying packets captured by the software component; and processing the identified packets to produce media exposure data.

In another exemplary embodiment, a system for monitoring a portable device, is disclosed, comprising: a communication; a processing device, configure to communicate with the portable device via said communication, said processing device being further configured to activate and deactivate an access software component, for accessing at least a kernel layer in the portable device; wherein the processing device is configured to communicate a software component, said software component being configured to execute packet capturing on the portable device when the access software component is deactivated; and an input for receiving and identifying packets captured by the software component, wherein the processing device is configured to process the identified packets to produce media exposure data. In further embodiments, packet based media exposure data is integrated with audio-based media exposure data comprising ancillary codes and signatures.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
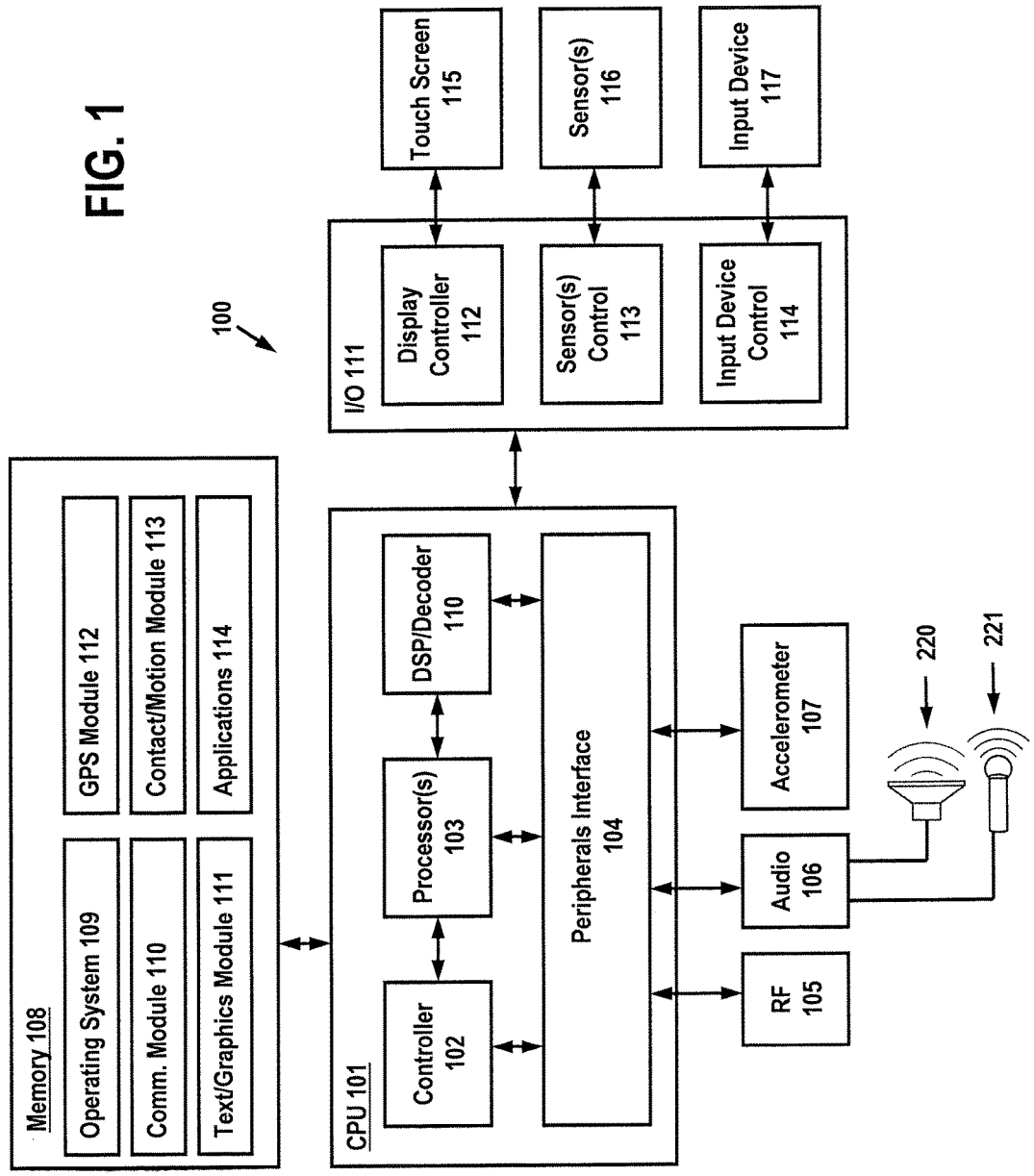
FIG. 1 illustrates an exemplary portable device capable of producing media exposure data under one embodiment.

FIG. 1 is an exemplary embodiment of a processing device 100, which may be a smart phone, tablet computer, or the like. Device 100 may include a central processing unit (CPU) 101 (which may include one or more computer readable storage mediums), a memory controller 102, one or more processors 103, a peripherals interface 104, RF circuitry 105, audio circuitry 106, a speaker 120, a microphone 120, and an input/output (I/O) subsystem 111 having display controller 112, control circuitry for one or more sensors 113 and input device control 114. These components may communicate over one or more communication buses or signal lines in device 100. It should be appreciated that device 100 is only one example of a portable multifunction device 100, and that device 100 may have more or fewer components than shown, may combine two or more components, or a may have a different configuration or arrangement of the components. The various components shown in FIG. 1 may be implemented in hardware, software or a combination of hardware and software (i.e., embodied in a tangible medium), including one or more signal processing and/or application specific integrated circuits.

DSP/Decoder 110 may serve to process incoming signals, and may be advantageously configured to process audio and/or decode ancillary data embedded in audio signals in order to detect exposure to media. Examples of techniques for encoding and decoding such ancillary data are disclosed in U.S. Pat. No. 6,871,180, titled "Decoding of Information in Audio Signals," issued Mar. 22, 2005, which is assigned to the assignee of the present application, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which is also assigned to the assignee of the present application, and which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

An audio signal which may be encoded with a plurality of code symbols is received at microphone 121, or via a direct link through audio circuitry 106. The received audio signal may be from streaming media, broadcast, otherwise communicated signal, or a signal reproduced from storage in a device. It may be a direct coupled or an acoustically coupled signal. From the following description in connection with the accompanying drawings, it will be appreciated that decoder 110 is capable of detecting codes in addition to those arranged in the formats disclosed hereinabove.

For received audio signals in the time domain, decoder 110 may also be advantageously configured to transform such signals to the frequency domain, preferably through a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, transformation may also be carried out by filters, by an application specific integrated circuit, or any other suitable device or combination of devices. The decoding may also be implemented by one or more devices which also implement one or more of the remaining functions illustrated in FIG. 1.

The frequency domain-converted audio signals are processed in a symbol values derivation function to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values.

The streams of symbol values are accumulated over time in an appropriate storage device (e.g., memory 108) on a symbol-by-symbol basis. This configuration is advantageous for use in decoding encoded symbols which repeat periodically, by periodically accumulating symbol values for the various possible symbols. For example, if a given symbol is expected to recur every X seconds, a stream of symbol values may be stored for a period of nX seconds (n>1), and added to the stored values of one or more symbol value streams of nX seconds duration, so that peak symbol values accumulate over time, improving the signal-to-noise ratio of the stored values. The accumulated symbol values are then examined to detect the presence of an encoded message wherein a detected message is output as a result. This function can be carried out by matching the stored accumulated values or a processed version of such values, against stored patterns, whether by correlation or by another pattern matching technique. However, this process is preferably carried out by examining peak accumulated symbol values and their relative timing, to reconstruct their encoded message. This process may be carried out after the first stream of symbol values has been stored and/or after each subsequent stream has been added thereto, so that the message is detected once the signal-to-noise ratios of the stored, accumulated streams of symbol values reveal a valid message pattern.

Alternately or in addition, processor(s) 103 (and/or DSP 110) can processes the frequency-domain audio data to extract a signature therefrom, i.e., data expressing information inherent to an audio signal, for use in identifying the audio signal or obtaining other information concerning the audio signal (such as a source or distribution path thereof). Suitable techniques for extracting signatures include those disclosed in U.S. Pat. No. 5,612,729 to Ellis, et al. and in U.S. Pat. No. 4,739,398 to Thomas, et al., both of which are incorporated herein by reference in their entireties. Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO/2002/11123 to Wang, et al. and PCT publication WO/2003/091990 to Wang, et al., all of which are incorporated herein by reference in their entireties. The signature extraction may serve to identify and determine media exposure for the user of a device. Audio signatures may be taken from the frequency domain, the time domain, or a combination of both. It is understood by those skilled in the art, that, while specific embodiments to audio-based media exposure are disclosed, the terms "media data" and "media" as used herein generally mean data which is widely accessible, whether over-the-air, or via cable, satellite, network, inter-network (including the Internet), print, displayed, distributed on storage media, or by any other means or technique that is humanly perceptible, without regard to the form or content of such data, and including but not limited to audio, video, audio/video, text, images, animations, databases, broadcasts, signals, web pages, print media and streaming media data. Similarly, the term "research data" or "media exposure data" as used herein means data comprising (1) data concerning usage of media data, (2) data concerning exposure to media data, and/or (3) market research data.

Memory 108 may include high-speed random access memory (RAM) and may also include non-volatile memory, such as one or more magnetic disk storage devices, flash memory devices, or other non-volatile solid-state memory devices. Access to memory 108 by other components of the device 100, such as processor 103, decoder 110 and peripherals interface 104, may be controlled by the memory controller 102. Peripherals interface 104 couples the input and output peripherals of the device to the processor 103 and memory 108. The one or more processors 103 run or execute various software programs and/or sets of instructions stored in memory 108 to perform various functions for the device 100 and to process data. In some embodiments, the peripherals interface 404, processor(s) 103, decoder 110 and memory controller 102 may be implemented on a single chip, such as a chip 101. In some other embodiments, they may be implemented on separate chips.

RF (radio frequency) circuitry 105 receives and sends RF signals, also called electromagnetic signals. The RF circuitry 105 converts electrical signals to/from electromagnetic signals and communicates with communications networks and other communications devices via the electromagnetic signals. The RF circuitry 105 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 105 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11 a, IEEE 802.11 b, IEEE 802.11g and/or IEEE 802.11n), voice over Internet Protocol (VoiP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS), or any other suitable communication protocol, including communication protocols not yet developed as of the filing date of this document.

Audio circuitry 106, speaker 120, and microphone 121 provide an audio interface between a user and the device 100. Audio circuitry 406 may receive audio data from the peripherals interface 104, converts the audio data to an electrical signal, and transmits the electrical signal to speaker 120. The speaker 120 converts the electrical signal to human-audible sound waves. Audio circuitry 406 also receives electrical signals converted by the microphone 121 from sound waves, which may include encoded audio, described above. The audio circuitry 106 converts the electrical signal to audio data and transmits the audio data to the peripherals interface 104 for processing. Audio data may be retrieved from and/or transmitted to memory 108 and/or the RF circuitry 105 by peripherals interface 104. In some embodiments, audio circuitry 106 also includes a headset jack for providing an interface between the audio circuitry 106 and removable audio input/output peripherals, such as output-only headphones or a headset with both output (e.g., a headphone for one or both ears) and input (e.g., a microphone).

I/O subsystem 121 couples input/output peripherals on the device 100, such as touch screen 125 and other input/control devices 127, to the peripherals interface 104. The I/O subsystem 121 may include a display controller 122 and one or more input controllers 124 for other input or control devices. The one or more input controllers 124 receive/send electrical signals from/to other input or control devices 127. The other input/control devices 127 may include physical buttons (e.g., push buttons, rocker buttons, etc.), dials, slider switches, joysticks, click wheels, and so forth. In some alternate embodiments, input controller(s) 124 may be coupled to any (or none) of the following: a keyboard, infrared port, USB port, and a pointer device such as a mouse, an up/down button for volume control of the speaker 120 and/or the microphone 121. Touch screen 125 may also be used to implement virtual or soft buttons and one or more soft keyboards.

Touch screen 125 provides an input interface and an output interface between the device and a user. The display controller 122 receives and/or sends electrical signals from/ to the touch screen 125. Touch screen 125 displays visual output to the user. The visual output may include graphics, text, icons, video, and any combination thereof (collectively termed "graphics"). In some embodiments, some or all of the visual output may correspond to user-interface objects, further details of which are described below. As describe above, touch screen 125 has a touch-sensitive surface, sensor or set of sensors that accepts input from the user based on haptic and/or tactile contact. Touch screen 125 and display controller 122 (along with any associated modules and/or sets of instructions in memory 108) detect contact (and any movement or breaking of the contact) on the touch screen 115 and converts the detected contact into interaction with user-interface objects (e.g., one or more soft keys, icons, web pages or images) that are displayed on the touch screen. In an exemplary embodiment, a point of contact between a touch screen 415 and the user corresponds to a finger of the user. Touch screen 125 may use LCD (liquid crystal display) technology, or LPD (light emitting polymer display) technology, although other display technologies may be used in other embodiments. Touch screen 125 and display controller 122 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 125.

Device 100 may also include one or more sensors 126 such as optical sensors that comprise charge-coupled device (CCD) or complementary metal-oxide semiconductor (CMOS) phototransistors. The optical sensor may capture still images or video, where the sensor is operated in conjunction with touch screen display 125. Sensors 126 also and preferably include gyroscope sensors, for sensing device orientation, and grip sensors, described in greater detail below. The sensors may be embodied within device 100, or located externally to device 100, while communicating sensor readings to I/O 121.

Device 100 may also include one or more accelerometers 107, which may be operatively coupled to peripherals interface 104. Alternately, the accelerometer 107 may be coupled to an input controller 114 in the I/O subsystem 111. In some embodiments, information displayed on the touch screen display may be altered (e.g., portrait view, landscape view) based on an analysis of data received from the one or more accelerometers and/or gyroscopes.

In some embodiments, the software components stored in memory 108 may include an operating system 109, a communication module 110, a contact/motion module 113, a text/graphics module 111, a Global Positioning System (GPS) module 112, and applications 114. Operating system 109 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 110 facilitates communication with other devices over one or more external ports and also includes various software components for handling data received by the RF circuitry 105. An external port (e.g., Universal Serial Bus (USB), FIRE WIRE, etc.) may be provided and adapted for coupling directly to other devices or indirectly over a network (e.g., the Internet, wireless LAN, etc.).

Contact/motion module 113 may detect contact with the touch screen 115 (in conjunction with the display controller 112) and other touch sensitive devices (e.g., a touchpad or physical click wheel). The contact/motion module 113 includes various software components for performing various operations related to detection of contact, such as determining if contact has occurred, determining if there is movement of the contact and tracking the movement across the touch screen 115, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 413 and the display controller 412 also detects contact on a touchpad.

Text/graphics module Ill includes various known software components for rendering and displaying graphics on the touch screen 115, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 112 determines the location of the device and provides this information for use in various applications. Applications 114 may include various modules, including address books/contact list, email, instant messaging, video conferencing, media player, widgets, instant messaging, camera/image management, and the like. Examples of other applications include word processing applications, JAVA-enabled applications, encryption, digital rights management, voice recognition, and voice replication.

In one embodiment, device 100 is equipped with monitoring software capable of packet capturing features. The software may comprise an application programming interface (API) for capturing packets travelling over a network and may also transmit packets, as well as receive listings of network interfaces for possible use. As mentioned above, it is desirable to have the monitoring software installed in a non-obtrusive way, so that (a) a user may not detect the operation of the monitoring software, and (b) the software does not materially interfere with the requirements and/or specifications of the operating system running the device (particularly those that may prevent unprivileged access). Accordingly, an advantageous configuration for installing such monitoring software provides monitoring at a low level of the device's system architecture.

Figure 2:
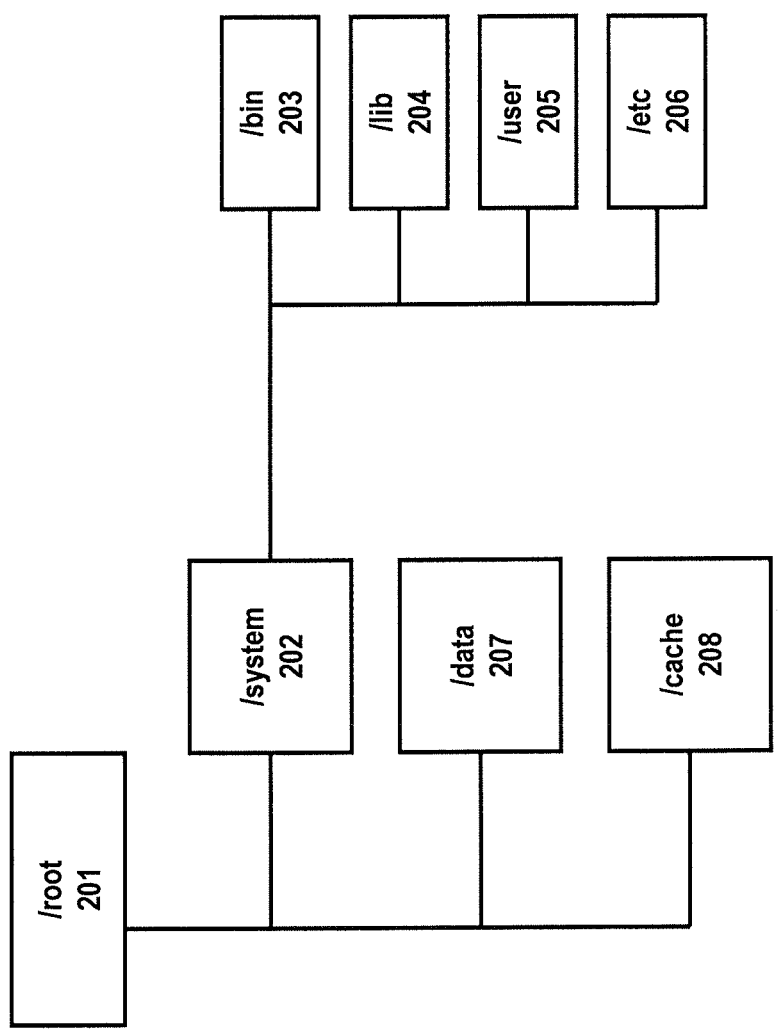
FIG. 2 illustrates an exemplary operation system directory tree for the device of FIG. 1.

Turning to FIG. 2, an exemplary directory tree of an operation system. In this example, the tree is representative of the Android operating system, which is a Linux-based operating system designed primarily for touchscreen mobile devices such as smartphones and tablet computers. Android is open source released under the Apache License, and has permissive licensing that allows the software to be freely modified and distributed by device manufacturers, wireless carriers and developers. As can be seen in FIG. 2, the directory tree comprises a "/root" home directory 201 for the root user. Also referred to as a login directory, it serves as a repository for a user's personal files that include configuration files, directories and programs, and is also the first directory accessed. The root account (also referred to as a root user, administrative user, system administrator, or "superuser") is the account that has access to all commands and files. /root 201 is a standard first-tier directory in the root directory (as well as /bin, /boot, /dev, /etc, /home, /mnt, /sbin and /usr). The root directory is the top level directory that contains all other directories and their subdirectories, and contains configuration files for the root account, and contains configuration and other files for that device. It is typically created automatically when the operating system is installed. The root directory 201 comprises a /system 202 directory, which is typically read-only, and comprises /bin directory 203 that comprises user utilities fundamental to both single-user and multi-user environments; /lib directory 204 comprising libraries essential for the binaries in /bin 203; /user directory 205 comprising secondary hierarchy for read-only user data, and contains the majority of user utilities and applications; and /etc directory 206 that comprises system configuration files and scripts. In addition, the root /data 207 folder is a read/writeable directory for storing root data, and /cache 208 folder is also a read/writeable directory for cache contents. It should be understood that other directories and sub-directories known in the art are also present in the directory tree, but were omitted in the present disclosure for the sake of brevity.

In order to access the root directory, it is necessary to gain privileged access (or "root" access) to the device in order to run monitoring software. Under one embodiment, privileged access is gained temporarily for purpose of executable installation, and without permanently effecting the phone. Temporarily privileged access may be advantageous over permanently privileged access because the operating system is not permanently modified on the flash memory, which in turn keeps a device compliant with operating system specifications. As will be seen below, there are a number of mechanisms to gain temporary privilege. In one embodiment, these mechanisms take advantage of certain behaviors of Android OS. The mechanism is based on the source code and behavior of Android Debug Bridge (ADB). ADB allows a processing device (e.g., PC) to connect to device 100 and perform certain operations, including application installation. Initially, ADB may launch a simple shell on the device, using the command "adb shell," depending on the value of system property "ro.secure." If ro.secure is set to zero, the ADB shell will run commands as the root user on the device. But if ro.secure is set to one, an ADB shell will run commands as an unprivileged user on the device. Typically, the value of this property is set at boot time from the default.prop file in the root directory. The contents of the root directory are essentially copied from a partition in the internal storage on boot.

Figure 3:
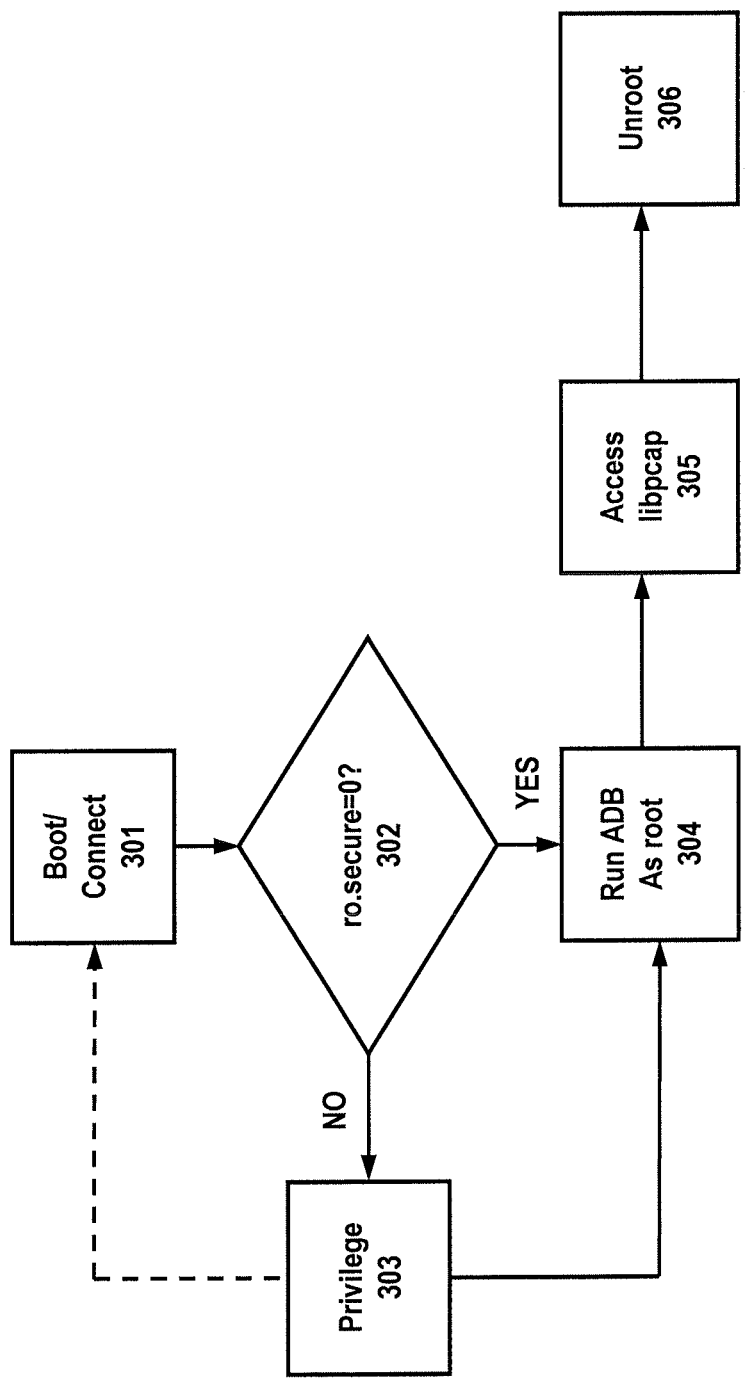
FIG. 3 illustrates an exemplary flow chart of securing privileged access for the device of FIG. 1 under one embodiment.

Turning to FIG. 3, an exemplary process is provided for gaining privileged access. Here, device (100) boots and connects with ADB 301, and determines if privileged access is set 302 (ro.secure=O). If privileged access is allowed, ADB is run as root, which allows it to install monitoring software having access to libpcap 305. Once installation is completed, device 100 is unrooted 306 to its original format. ro.secure is part of Android property service which is similar to Windows registry service. All property records are stored in the shared memory block defined in environment variable ANROID_PROPERTY_WORKSPACE. Once mapped to its own virtual space by mmap( ), a process can perform certain control over the shared memory block (see FIG. 4). The control on shared memory block is only temporary on the RAM and will not be persistent once phone is rebooted. Therefore, the OS runtime environment will be intact once rebooted. In an alternate embodiment, if privileged access is allowed (ro.secure=O), ADB creates a shell that mounts/system as read-write (as opposed to read-only), and installs superuser (su) binary (superuser.apk, busybox) and then remounts/system back as read-only. Rooting using insecure boot.img is possible as well.

If privileged access is not allowed in step 302 (ro.secure=1), a number of techniques may be used to gain privileged access in 303. Since the init process parses root data files for property settings at boot, one exemplary process modifies this data to allow privileged access, allowing an ADB shell to run as root. The modification involves the placing of a file containing the string "ro.kernel.qemu=1" into the root data folder, and place a symlink pointing to the folder from a log file. On reboot, init will copy the new file on top of local, prop, allowing ADB to run as root. In another exemplary embodiment, universal exploits may be utilized to gain privileged access, with the option of flashing the "hboot" image after rooting. A subsequent unrooting process may be accomplished by patching ADBD binary as insecure. Existing software, such as HTC Quick Root, z4root, gingerbreak and others are available that exploit system vulnerabilities for gaining privileged access, however, such systems are well known and will not be discussed here in detail.

Figure 4:
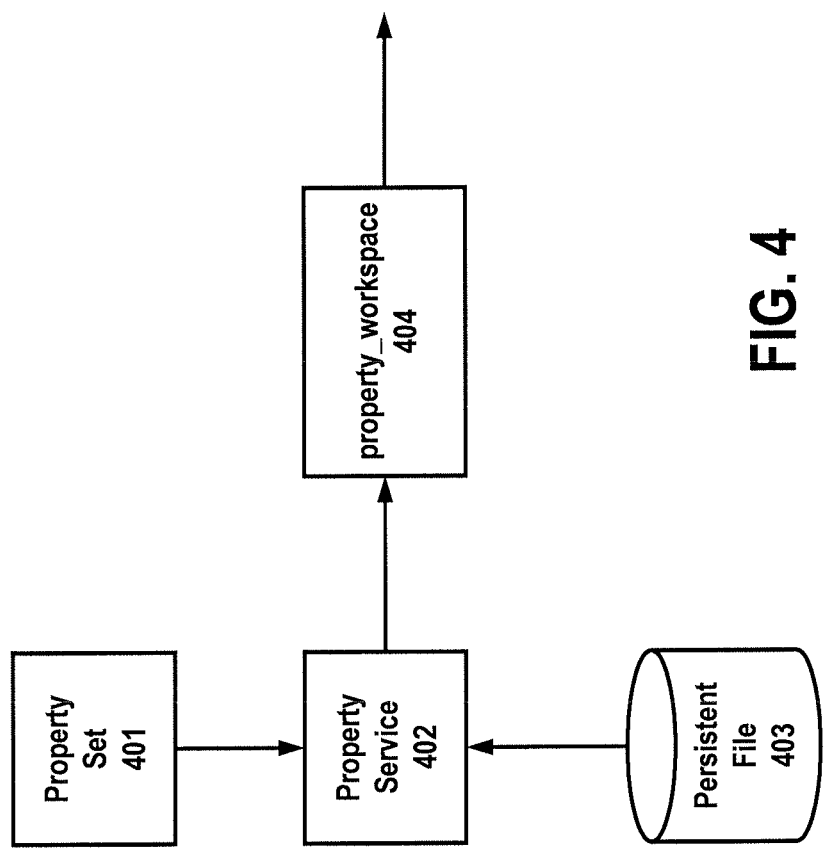
FIG. 4 illustrates an exemplary property system for use with monitoring software under another embodiment.

Turning to FIG. 4, an exemplary property system is illustrated for use with monitoring software. In the figure, there are three processes, a group of persistent property files 403 and a shared memory block 402, where the shared memory block is the container of property records. The property service process 402 may write to the shared memory block and may load property records from persistent files to save them in the shared memory. The shared memory may be loaded in its own virtual space and may access properties directly. Property set 401 may also load the shared memory in its virtual space, but it can't write to the memory directly. When the setter tries to add or update a property, it sends the property to a property service that may write the property to shared memory on behalf of the setter process, as well as to the persistent file.

Property service 402 runs inside init process, where the init process first creates a shared memory region and stores a fd to the region. Then init process maps the region into its virtual space with mmap with MAP_SHARED flag, and, as a result, any updates to this area can be seen by all processes. This fd and region size may be saved in an environment variable named "ANDROID_PROPERTY_WORKSPACE." Any other processes may use this environment variable to get the fd and size, so that they can mmap this region into its own virtual space 404.

Using the techniques described above, packet capturing processes may be installed on a device (100). Once privileged access is obtained, the monitoring software should be able to access network monitoring functionality of Packet Capture Library (i.e. libpcap). The Packet Capture library provides a high level interface to packet capture systems. All packets on the network are accessible through this mechanism. Packet Capture library allows the user to intercept and display TCP/IP and other packets being transmitted or received over a network. Libcap is maintained by the Tcpdump group (http://www.tcpdump.org/), where further information may be found.

As Packet Capture library is only allowed as privileged user, the standard library with assigned application user ID may not be operable as an unprivileged application. However, this limitation can be overcome by utilizing "setuid" and "setgid" (set user ID upon execution and set group ID upon execution, respectively), which are Unix access rights flags that allow users to run an executable with the permissions of the executable's owner or group. They are often used to allow users on a computer system to run programs with temporarily elevated privileges in order to perform a specific task. setuid and setgid are advantageous for tasks that require higher privileges than those which common users have, such as changing their login password. In this case, they are advantageous for monitoring network traffic on wireless interface with Packet Capture library. In a preferred embodiment, the monitoring software comprises a Packet Capture library that may be installed as an executable file into device 100 as part of an application package. The installation of this executable file is different than normal application installation which is installed in assigned user disk space. This executable should be installed in particular operating system disk partition which allows setuid/setgid to work (i.e., /system/bin).

Figure 5:
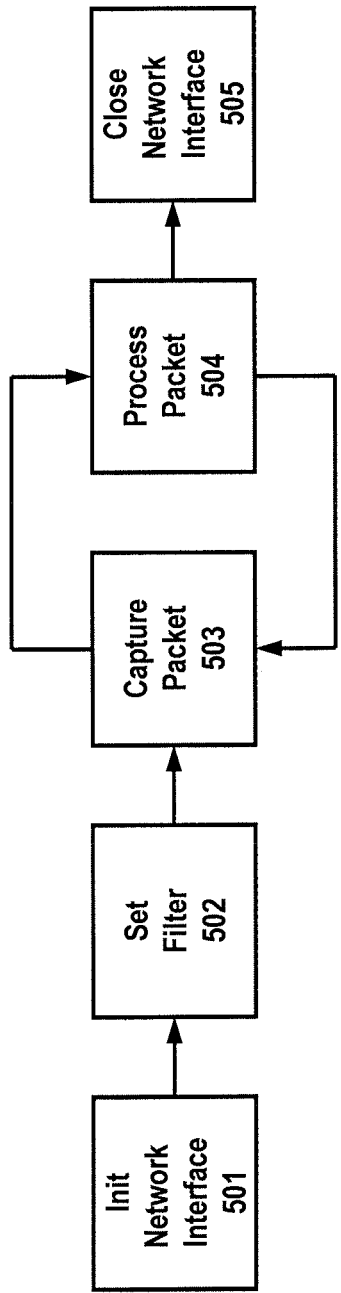
FIG. 5, illustrates an exemplary packet capture process on the device of FIG. 1.

Turning to FIG. 5, an exemplary packet capture process for monitoring software is disclosed, utilizing a libpcap library that provides a high level interface to network packet capture systems. In step 501, a network interface is initialized for the monitoring software to listen for packets. The interface may be specified explicitly, or may be selected automatically by libpcap. Once initialized, the interface is opened and an interface handler may be provided for calling libpcap functions. At this time, it may be advantageous to specify the maximum number of bytes to capture. For applications involving small amounts of data (e.g., capturing headers only), a small value may be more efficient. Large sizes (e.g., 1500+ bytes) may be more appropriate for capturing frames subject to maximum transmission unit (MTU) specifications, and even larger sizes (e.g., 6000+ bytes) may be used for capturing any type of packet from any network. In certain embodiments, a capture time may be also specified (in milliseconds) to determine how long the kernel should wait before copying the captured information from the kernel space (layer) to the user space.

Once the network is initialized, the monitoring software begins to capture packets in 503, in which a function executed by the handler may begin collecting and processing (504) packets until a certain count is reached. It is noted that the capturing may be executed under a "promiscuous" or "non-promiscuous" modes. In standard, non-promiscuous capture, a host is capturing only traffic that is directly related to it. Thus, only traffic to, from, or routed through the device may be captured. Promiscuous mode, on the other hand, captures all traffic on the connection. In a preferred embodiment, a filer is set 502 during the capturing process in order to limit the types of packets being collected. For instance, certain embodiments may capture data on a specific port (port 23 telnet) to capture specific data (e.g., passwords) or files (e.g., FTP being sent over port 21). In other embodiment, DNS traffic may be captured (e.g., port 53 UDP). Regardless of the specific application, filter 502 may be set using pcap_compile( ) and pcap_setfilter( ) functions. When applying a filter, it should be compiled, where the filter expression may be kept in a regular string (char array). After the expression has been compiled, it is applied using pcap_setfilter( ), where arguments may include the session handler and a reference to the compiled version of the expression. While different operating systems may employ different packet filtering mechanisms, many should at least be based on the Berkeley Software Distribution (BSD) Packet Filter or Berkeley Packet Filter (BPF) architecture.

During the packet capturing process, packets may be captured a single packet at a time, or may enter a loop that waits for a certain number of packets to be captured. For single packet capture, the pcap_next( ) function may be used by providing a first argument defining a session handler and a second argument comprising a pointer to a structure that holds general information about the packet (e.g., time of capture, length, etc.). During capture, the pcap_next( ) function returns pointer to the packet that is described by this structure. Preferably, packet capturing is performed in a loop utilizing a callback function that is called a packet is captured. Two exemplary functions for defining callback comprise pcap_loop( ) and pcap_dispatch( ), both of which call a callback function every time a packet is detected meeting filter requirements. As packets are detected, each packet contains a collection of structures (e.g., a TCP/IP packet would have an Ethernet header, an IP header, a TCP header, and packet's payload). A pointer in the monitoring software points to a serialized version of these structures, where typecasting and other techniques may be used to extract useful data. After packet capture is completed, the network interface may then be closed 505.

Figure 6:
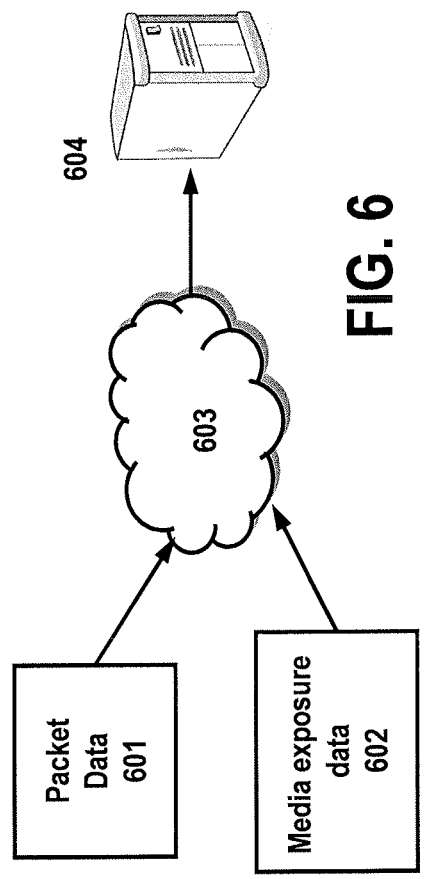
FIG. 6 illustrates the integration of audio media exposure data with packet capture under another exemplary embodiment.

It can be appreciated that the present disclosure provides efficient and compliant techniques for installing monitoring software on portable devices. Furthermore, when combined with audio media exposure data monitoring, more comprehensive data may be obtained regarding web-based and audio based media exposure for one device. Turning to FIG. 6, it can be seen that captured packet data for a device (100) is stored, and set to a network 603 via wired or wireless means. Similarly, audio media exposure data 602, such as audio codes and/or signatures, are separately stored on device and subsequently transmitted to network 603. Central server 602 collects both data (601, 602) and correlates the data to determine data network activity and media exposure for a given time period. As an example, a user of device 100 may be surfing the Internet while listening to a radio broadcast. Since packet data 601 can provide information regarding Internet-related activity, and media exposure data 602 may provide information regarding the radio broadcast, server 604 may be able to process this data to determine correlations between the two mediums. As a further example, it may be determined that, while user of device 100 heard a particular commercial, the user accessed a website relating to the subject matter or content of the commercial.

While at least one exemplary embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

We claim:

1. An apparatus comprising:
    a processor; and
    a memory to store machine readable instructions that, when executed by the processor, cause the processor to at least:
        connect to a portable device using a shell;
        verify whether the shell has an elevated privilege on the portable device;
        in response to detecting that the shell does not have the elevated privilege, gain the elevated privilege; and
        install a packet capturer on the portable device using the elevated privilege, the packet capturer to capture packets to produce media exposure data, the elevated privileges to enable the packet capturer to capture packets after disconnection of the shell from the portable device, the packet capturer to communicate between a kernel layer and a user layer of the portable device.

2. The apparatus of claim 1, wherein the machine readable instructions, when executed by the processor, further cause the processor to store a file on the portable device including an instruction to cause the portable device to, upon a subsequent boot, grant the elevated privilege to the shell.

3. A method for monitoring a portable device, the method comprising:
    connecting to the portable device using a shell;
    verifying, by executing an instruction with a processor, whether the shell has an elevated privilege on the portable device;
    in response to detecting that the shell does not have the elevated privilege, gaining, by executing an instruction with the processor, the elevated privilege; and
    installing, by executing an instruction with the processor, a packet capturer on the portable device using the elevated privilege, the packet capturer to capture packets to produce media exposure data, the elevated privileges to enable the packet capturer to capture packets after disconnection of the shell from the portable device.

4. The method of claim 3, wherein the gaining of the elevated privilege includes:
    storing a file on the portable device including an instruction to cause the portable device to, upon a subsequent boot, grant the elevated privilege to the shell; and
    rebooting the portable device.

5. The method of claim 3, further including disconnecting the shell from the portable device.

6. The method of claim 3, wherein connecting to the portable device using the shell further includes using a debug bridge.

7. The method of claim 6, wherein gaining the elevated privilege includes rooting the portable device, and further including, in response to installing the packet capturer using the elevated privilege, un-rooting the portable device.

8. The method of claim 3, wherein the portable device includes at least one of a cell phone, a smart phone, or a tablet.

9. The method of claim 3, further including instructing the portable device to collect audio media exposure data.

10. The method of claim 9, wherein the audio media exposure data includes at least one of an audio code or an audio signature.

11. The method of claim 10, wherein the audio code is formed from audio signals converted at least in part to a frequency domain.

12. A tangible machine readable storage disk or storage device comprising instructions which, when executed, cause a machine to at least:
    connect to a portable device using a shell;
    verify whether the shell has an elevated privilege on the portable device;
    in response to detecting that the shell does not have the elevated privilege, gain the elevated privilege; and
    install a packet capturer on the portable device using the elevated privilege, the packet capturer to capture packets to produce media exposure data, the elevated privileges to enable the packet capturer to capture packets after disconnection of the shell from the portable device.

13. The tangible machine readable storage disk or storage device of claim 12, wherein the instructions, when executed, further cause the machine to at least:
    store a file on the portable device including an instruction to cause the portable device to, upon a subsequent boot, grant the elevated privilege to the shell; and
    reboot the portable device.

14. The tangible machine readable storage disk or storage device of claim 12, wherein the instructions, when executed, cause the machine to disconnect the shell from the portable device.

15. The tangible machine readable storage disk or storage device of claim 12, wherein the instructions, when executed, cause the machine to use a debug bridge to connect to the portable device using the shell.

16. The tangible machine readable storage disk or storage device of claim 15, wherein the instructions, when executed, cause the machine to gain the elevated privilege by rooting the portable device, and the instructions, when executed, cause the machine to, in response to installing the packet capturer using the elevated privilege, un-root the portable device.

17. The tangible machine readable storage disk or storage device of claim 12, wherein the portable device includes at least one of a cell phone, a smart phone, or a tablet.

18. The tangible machine readable storage disk or storage device of claim 12, wherein the instructions, when executed, cause the machine to instruct the portable device to collect audio media exposure data.

19. The tangible machine readable storage disk or storage device of claim 18, wherein the audio media exposure data includes at least one of an audio code or an audio signature.

20. The tangible machine readable storage disk or storage device of claim 19, wherein the audio code is formed from audio signals converted at least in part to a frequency domain.

* * * * *